US010336400B2

(12) United States Patent
Hara

(10) Patent No.: US 10,336,400 B2
(45) Date of Patent: Jul. 2, 2019

(54) BICYCLE TRANSMISSION CONTROL APPARATUS

(71) Applicant: Shimano Inc., Sakai, Osaka (JP)

(72) Inventor: Nobukatsu Hara, Osaka (JP)

(73) Assignee: Shimano Inc., Osaka (JP)

( * ) Notice: Subject to any disclaimer, the term of this patent is extended or adjusted under 35 U.S.C. 154(b) by 287 days.

(21) Appl. No.: 14/925,471

(22) Filed: Oct. 28, 2015

(65) Prior Publication Data

US 2016/0280330 A1     Sep. 29, 2016

Related U.S. Application Data

(63) Continuation-in-part of application No. 14/671,888, filed on Mar. 27, 2015.

(51) Int. Cl.

| G06F 17/00 | (2019.01) |
|---|---|
| B62K 25/28 | (2006.01) |
| B62K 25/30 | (2006.01) |
| B62M 9/123 | (2010.01) |
| B62M 9/133 | (2010.01) |
| B62J 99/00 | (2009.01) |

(52) U.S. Cl.
CPC ............ *B62K 25/286* (2013.01); *B62K 25/30* (2013.01); *B62M 9/123* (2013.01); *B62M 9/133* (2013.01); *B62J 2099/002* (2013.01)

(58) Field of Classification Search
None
See application file for complete search history.

(56) References Cited

U.S. PATENT DOCUMENTS

| 5,609,552 A | * | 3/1997 | Furuya .................... F16H 59/72 |
|---|---|---|---|
| | | | 477/174 |
| 8,091,910 B2 | | 1/2012 | Hara et al. |
| 8,825,322 B1 | | 9/2014 | Ikemoto et al. |
| 2003/0071435 A1 | * | 4/2003 | Schaeffer ............... A61G 5/023 |
| | | | 280/248 |
| 2013/0138302 A1 | | 5/2013 | Hara et al. |
| 2013/0221713 A1 | * | 8/2013 | Pelot ......................... B62J 1/02 |
| | | | 297/215.13 |
| 2014/0345411 A1 | * | 11/2014 | Miki ..................... F16H 59/044 |
| | | | 74/473.12 |
| 2016/0001843 A1 | * | 1/2016 | Evans ..................... B62K 9/00 |
| | | | 280/7.17 |

FOREIGN PATENT DOCUMENTS

| CN | 103129664 A | 6/2013 |
|---|---|---|
| DE | 102 42 447 A1 | 3/2004 |

* cited by examiner

*Primary Examiner* — Adam M Alharbi
(74) *Attorney, Agent, or Firm* — Global IP Counselors, LLP

(57) ABSTRACT

A bicycle transmission control apparatus is basically provided with a controller that is configured to control a gear ratio of a transmission based on seat height information of a bicycle seat relative to a bicycle frame, or change a parameter for shifting the transmission based on the seat height information of the bicycle seat relative to the bicycle frame.

16 Claims, 11 Drawing Sheets

| Gear Ratio | FC(T) | CS(T) |
|---|---|---|
| 2.9 | 32 | 11 |
| 2.5 | 32 | 13 |
| 2.1 | 32 | 15 |
| 1.9 | 32 | 17 |
| 1.7 | 32 | 19 |
| 1.5 | 32 | 21 |
| 1.3 | 32 | 24 |
| 1.2 | 32 | 27 |
| 1.0 | 32 | 31 |
| 0.9 | 32 | 35 |
| 0.8 | 32 | 40 |

FIG. 7

| | | ASP HEIGHT(mm) | | |
|---|---|---|---|---|
| | | HIGH (150-120) | MIDDLE (120-70) | LOW (70-0) |
| SPEED OF BICYCLE (KM/H) | 30 and UP | 2.9 | 2.9 | 2.9 |
| | 27-29 | 2.5 | 2.5 | 2.5 |
| | 26 | 2.1 | 2.5 | 2.5 |
| | 24-25 | 2.1 | 2.1 | 2.5 |
| | 23 | 1.9 | 2.1 | 2.5 |
| | 21-22 | 1.9 | 1.9 | 2.5 |
| | 20 | 1.7 | 1.9 | 2.5 |
| | 18-19 | 1.7 | 1.7 | 2.1 |
| | 17 | 1.5 | 1.7 | 2.1 |
| | 15-16 | 1.5 | 1.5 | 2.1 |
| | 14 | 1.3 | 1.5 | 2.1 |
| | 12-13 | 1.3 | 1.3 | 1.7 |
| | 11 | 1.2 | 1.3 | 1.7 |
| | 10 | 1.2 | 1.2 | 1.7 |
| | 9 | 1.2 | 1.2 | 1.5 |
| | 8 | 1.0 | 1.2 | 1.5 |
| | 7 | 1.0 | 1.0 | 1.5 |
| | 6 | 1.0 | 1.0 | 1.3 |
| | 3-5 | 0.9 | 1.0 | 1.3 |
| | 0-2 | 0.8 | 1.0 | 1.2 |

FIG. 8

|  | TORQUE (NM) | ASP HEIGHT(mm) | | |
|---|---|---|---|---|
|  |  | HIGH (150-120) | MIDDLE (120-70) | LOW (70-0) |
| 30 and UP | 100 and UP | 2.9 | 2.9 | 2.9 |
| 27-29 | 0-100 | 2.9 | 2.9 | 1.0 |
| 20-25 | 1000 and UP | 2.9 | 2.9 | 2.9 |
|  | 600-1000 | 2.5 | 2.5 | 2.9 |
|  | 400-600 | 2.1 | 2.1 | 2.9 |
|  | 100-400 | 2.1 | 2.1 | 2.1 |
|  | 0-100 | 2.1 | 2.1 | 1.0 |
| 15-20 | 1100 and UP | 2.9 | 2.9 | 2.9 |
|  | 800-1100 | 2.5 | 2.5 | 2.9 |
|  | 500-800 | 2.1 | 2.1 | 2.5 |
|  | 300-500 | 1.9 | 1.9 | 2.1 |
|  | 100-300 | 1.9 | 1.9 | 1.9 |
|  | 0-100 | 1.9 | 1.9 | 1.0 |
| 10-15 | 1200 and UP | 1.9 | 2.5 | 2.5 |
|  | 1100-1200 | 1.9 | 2.1 | 2.5 |
|  | 1000-1100 | 1.0 | 2.1 | 2.5 |
|  | 800-1000 | 1.7 | 1.9 | 2.5 |
|  | 700-800 | 1.5 | 1.9 | 2.1 |
|  | 600-700 | 1.5 | 1.7 | 2.1 |
|  | 400-600 | 1.3 | 1.7 | 2.1 |
|  | 300-400 | 1.2 | 1.5 | 2.1 |
|  | 200-300 | 1.2 | 1.5 | 1.9 |
|  | 100-200 | 1.0 | 1.5 | 1.9 |
|  | 0-100 | 1.0 | 1.5 | 1.0 |
| 0-10 | 1200 and UP | 1.0 | 2.1 | 1.5 |
|  | 900-1200 | 0.8 | 1.9 | 1.5 |
|  | 800-900 | 0.8 | 1.7 | 1.5 |
|  | 600-800 | 0.8 | 1.7 | 1.3 |
|  | 500-600 | 1.0 | 1.5 | 1.3 |
|  | 300-500 | 1.0 | 1.5 | 1.2 |
|  | 200-300 | 1.0 | 1.3 | 1.2 |
|  | 100-200 | 0.8 | 1.3 | 1.0 |
|  | 0-100 | 0.8 | 1.2 | 1.0 |

FIG. 11

| ASP height(mm) | Gear Ratio | FC(T) | CS(T) |
|---|---|---|---|
| high (150-120) | 1.0 | 32 | 31 |
| middle (120-70) | 1.5 | 32 | 21 |
| low (70-0) | 2.1 | 32 | 15 |
| middle (120-70) | 1.5 | 32 | 21 |

# BICYCLE TRANSMISSION CONTROL APPARATUS

CROSS-REFERENCE TO RELATED APPLICATIONS

This application is a continuation-in-part application of patent application Ser. No. 14/671,888 that was filed on Mar. 27, 2015. The entire disclosure of patent application Ser. No. 14/671,888 is hereby incorporated herein by reference.

BACKGROUND

Field of the Invention

This invention generally relates to a bicycle transmission control apparatus. More specifically, the present invention relates to a bicycle transmission control apparatus in which controls a bicycle transmission based on seat height information of a bicycle seat relative to a bicycle frame.

Background Information

Recently, some bicycles are provided with an adjustable seatpost in order to adjust the height of the bicycle seat while riding. The preferred seat height often changes based on changes in the inclination of the riding surface. For example, it is preferable for a rider have the height of the bicycle seat at a higher position during a hill climb than when traveling on a level riding surface or traveling downhill. On the other hand, it is also preferable for a rider have the height of the bicycle seat at a lower position when traveling downhill as compared to traveling on a level riding surface or during a hill climb.

SUMMARY

Generally, the present disclosure is directed to various features of a bicycle transmission control apparatus. In one feature, a bicycle transmission control apparatus is provided in which controls a transmission based on seat height information of a bicycle seat relative to a bicycle frame.

In view of the state of the known technology and in accordance with a first aspect of the present disclosure, a bicycle transmission control apparatus is provided that basically comprises a controller configured to control a gear ratio of a transmission based on seat height information of a bicycle seat relative to a bicycle frame, or change a parameter for shifting the transmission based on the seat height information of the bicycle seat relative to the bicycle frame.

In accordance with a second aspect of the present invention, the bicycle transmission control apparatus according to the first aspect is configured so that the seat height information includes at least one of a height of the bicycle seat or a change of the height of the bicycle seat.

In accordance with a third aspect of the present invention, the bicycle transmission control apparatus according to the first aspect further comprises a bicycle seat position sensor configured to transmit a bicycle seat position signal corresponding to a height of the bicycle seat relative to the bicycle frame.

In accordance with a fourth aspect of the present invention, the bicycle transmission control apparatus according to the third aspect is configured so that the controller is further configured to output a transmission control signal based on the bicycle seat position signal.

In accordance with a fifth aspect of the present invention, the bicycle transmission control apparatus according to the first aspect is configured further comprises a memory having a plurality of shift tables prestored therein as the parameter for shifting the transmission, the controller being configured to switch the shift table based on the seat height information of the bicycle seat relative to the bicycle frame.

In accordance with a sixth aspect of the present invention, the bicycle transmission control apparatus according to the fifth aspect is configured so that the memory includes a first shift table used when a height of the bicycle seat relative to the bicycle frame is in a first height range, a second shift table used when the height of the bicycle seat relative to the bicycle frame is in a second height range that is higher than the first height range, and a third shift table used when the height of the bicycle seat relative to the bicycle frame is in a third range that is higher than the second height range.

In accordance with a seventh aspect of the present invention, the bicycle transmission control apparatus according to the fifth aspect is configured so that the memory includes an automatic shifting program fir changing the gear ratio of the transmission based on the shift tables.

In accordance with an eighth aspect of the present invention, the bicycle transmission control apparatus according to the seventh aspect is configured so that the automatic shifting program is programmed to change the gear ratio of the transmission based on a detected bicycle speed and a selected one of the shift tables.

In accordance with a ninth aspect of the present invention, the bicycle transmission control apparatus according to the seventh aspect is configured so that the automatic shifting program is programmed to change the gear ratio of the transmission based on a detected bicycle speed, a pedaling torque and a selected one of the shift tables.

In accordance with a tenth aspect of the present invention, the bicycle transmission control apparatus according to the seventh aspect is configured so that the controller is configured to operate in one mode selected between a shift priority mode in which the gear ratio of the transmission is changed based on a shift command, and a seat priority mode in which the gear ratio of the transmission is fixed based on the seat height information of the bicycle seat relative to the bicycle frame and the shift command is ignored.

In accordance with an eleventh aspect of the present invention, a bicycle transmission control apparatus is provided that basically comprises a controller configured to control a gear ratio of a transmission based on an indication input for changing a height of a bicycle seat relative to a bicycle frame, or change a parameter for shifting the transmission based on the indication input for changing the height of the bicycle seat relative to the bicycle frame.

In accordance with a twelfth aspect of the present invention, the bicycle transmission control apparatus according to the eleventh aspect further comprises an adjustable seatpost operating device and a detection device. The adjustable seatpost operating device is configured to produce the indication input to change the height of the bicycle seat relative to the bicycle frame. The detection device is configured to detect the indication input by the adjustable seatpost operating device.

In accordance with a thirteenth aspect of the present invention, the bicycle transmission control apparatus according to the eleventh aspect is configured so that the controller is further configured to output a transmission control signal based on the indication input.

In accordance with a fourteenth aspect of the present invention, the bicycle transmission control apparatus according to the thirteenth aspect further comprises a memory having a plurality of shift tables prestored therein as the parameter for shifting the transmission, the controller being configured to switch the shift table based on the indication input.

In accordance with a fifteenth aspect of the present invention, the bicycle transmission control apparatus according to the fourteenth aspect is configured so that the memory includes an automatic shifting program for changing the gear ratio of the transmission based on the shift tables.

In accordance with a sixteenth aspect of the present invention, the bicycle transmission control apparatus according to the fifteenth aspect is configured so that the automatic shifting program is programmed to change the gear ratio of the transmission based on a detected bicycle speed and a selected one of the shift tables.

In accordance with a seventeenth aspect of the present invention, the bicycle transmission control apparatus according to the fifteenth aspect is configured so that the automatic shifting program is programmed to change the gear ratio of the transmission based on a detected bicycle speed, a pedaling torque and a selected one of the shift tables.

Also other objects, features, aspects and advantages of the disclosed bicycle transmission control apparatus will become apparent to those skilled in the art from the following detailed description, which, taken in conjunction with the annexed drawings, discloses illustrative embodiments of the bicycle transmission control apparatus.

BRIEF DESCRIPTION OF THE DRAWINGS

Referring now to the attached drawings which form a part of this original disclosure:

FIG. 7 is a gear ratio table illustrating the various ratios available for the bicycle illustrated in FIG. 1;

FIG. 8 is a first shift control pattern used for automatic shifting of the bicycle transmission of the bicycle illustrated in FIG. 1 based on the seat height information of the bicycle seat relative to the bicycle frame and a forward traveling speed of the bicycle;

FIG. 11 is a second shift control pattern used for automatic shifting of the bicycle transmission of the bicycle illustrated in FIG. 1 based on the seat height information of the bicycle seat relative to the bicycle frame and a forward traveling speed of the bicycle;

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
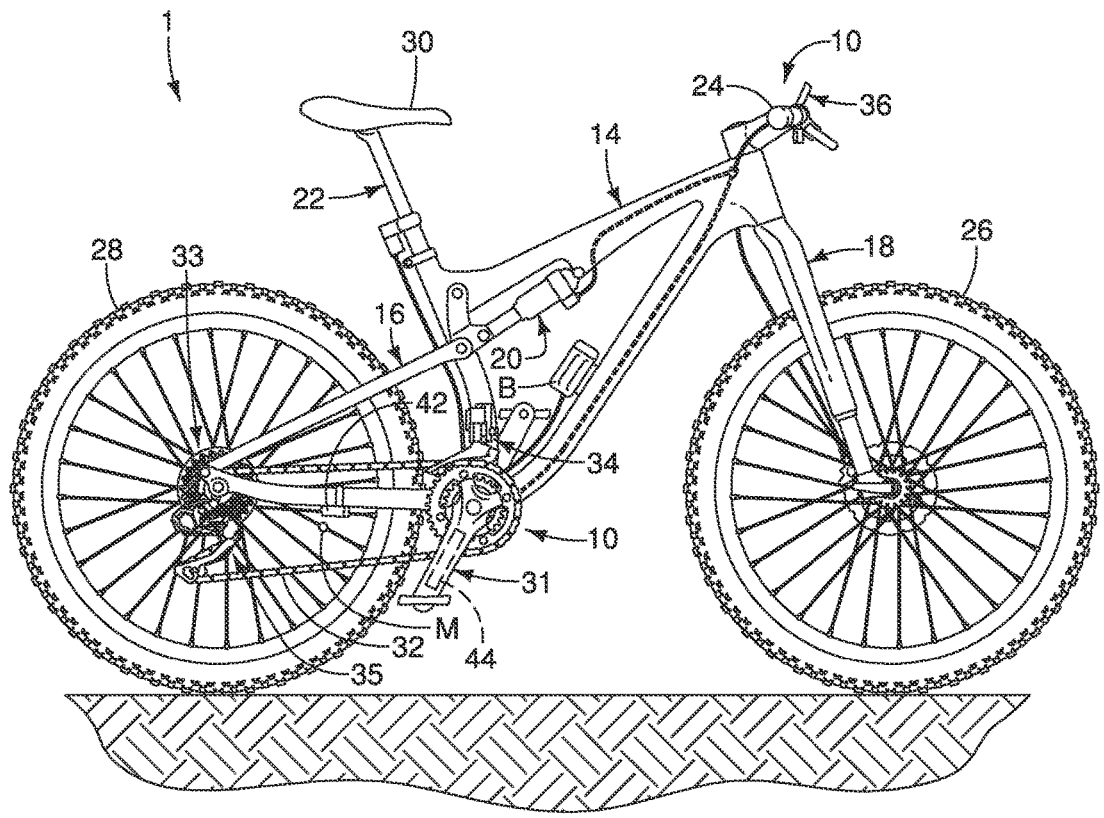
FIG. 1 is a side elevational view of a bicycle that is equipped with a bicycle transmission control apparatus in accordance with a first embodiment.

Referring initially to FIG. 1, a bicycle 1 is illustrated that is equipped with a bicycle transmission 10 that is controlled by a bicycle transmission control apparatus 12 in accordance with a first embodiment. While the bicycle 1 illustrated in FIG. 1 is a dual suspension (off-road) bicycle, the bicycle transmission control apparatus 12 can be used with other types of bicycles.

The bicycle 1 includes among other things a main bicycle frame 14, a rear swing arm or sub bicycle frame 16, a front suspension fork 18, a rear shock 20 and an adjustable seatpost 22. A handlebar 24 is fixed to the top of the front suspension fork 18 in order to steer the bicycle 1. The lower end of the front suspension fork 18 rotatably supports a front wheel 26. The rear swing arm 16 is pivotally mounted to the main bicycle frame 14, and rotatably supports a rear wheel 28. A bicycle seat or saddle 30 is mounted to the adjustable seatpost 22, which is adjustably mounted to the main bicycle frame 14.

The bicycle transmission 10 includes having a front pedal crankset 31, a rear sprocket cassette 32 and a chain 33. The bicycle 1 further includes a front derailleur 34 (i.e., transmission device) and a rear derailleur 35 (i.e., transmission device) tier changing speeds of the bicycle transmission 10.

The front derailleur 34 is mounted on the main bicycle frame 14, while the rear derailleur 35 is mounted on the rear swing arm 16. Alternatively, the rear derailleur 35 can be replaced with an internally geared hub as the rear transmission device. Also depending on the configuration of the bicycle, only a single transmission device can be used. Pedaling force from the front pedal crankset 31 is transferred to the chain 33, which in turn transfers the pedaling force to the rear wheel 28 via the rear sprocket cassette 32 that is mounted to the rear wheel 28 via a freewheel mechanism. Conventional front and rear mechanical braking mechanisms are also provided.

In the illustrated embodiment, the front suspension fork 18, the rear shock 20, the adjustable seatpost 22, the front derailleur 34 and the rear derailleur 35 are examples of bicycle electrical components that are adjustable between at least two operation modes. Thus, in certain instances herein, the front suspension fork 18, the rear shock 20, the adjustable seatpost 22, the front derailleur 34 and the rear derailleur 35 will be collectively referred to as bicycle electrical components. As explained below, the bicycle electrical components 18, 20, 22, 34 and 35 are configured for wired communications. However, the bicycle electrical components 18, 20, 22, 34 and 35 could be configured for wireless communications if needed and/or desired. If the bicycle electrical components 18, 20, 22, 34 and 35 are configured for wireless communications, then the bicycle electrical components 18, 20, 22, 34 and 35 could each have its own individual battery respectively.

Since bicycle electrical components such as the bicycle electrical components 22, 34 and 35 illustrated herein are well known in the bicycle field, the bicycle electrical components 22, 34 and 35 will only be discussed to the extent needed to understand the modifications made to carry out the present invention. Also, the bicycle electrical components 22, 34 and 35 are not limited to the electric bicycle components and the particular arrangements disclosed herein. Rather, the bicycle 1 can have any combination of the bicycle electrical components 18, 20, 22, 34 and 35 as well as other bicycle electrical components (not shown) as needed and/or desired.

Figure 2:
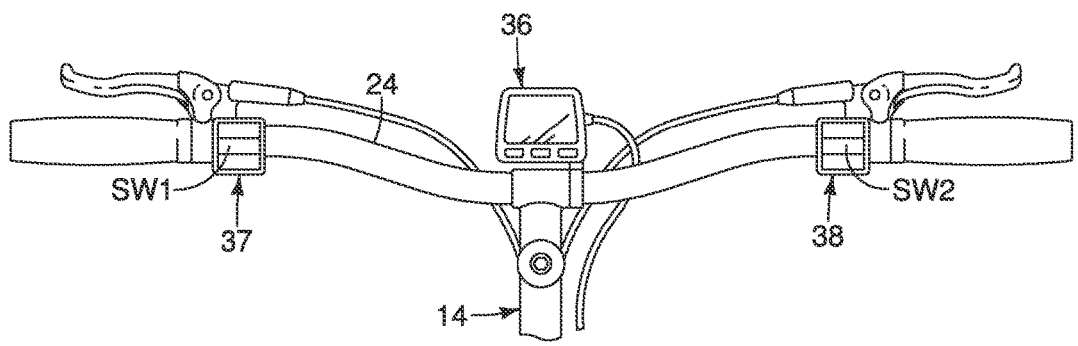
FIG. 2 is a top plan view of the handlebar of the bicycle illustrated in FIG. 1, with a cycle computer, electrical shifters and traditional brake levers mounted thereto.

As seen in FIG. 2, the handlebar 24 is provided with a cycle computer 36, a first electrical component operating device 37 and a second electrical component operating device 38. The cycle computer 36, the first electrical component operating device 37 and the second electrical component operating device 38 form a control system that controls the operations of the bicycle electrical components 18, 20, 22, 34 and 35. The bicycle 1 further includes numerous other components that are typically installed on a bicycle, but that are not related to the bicycle transmission control apparatus 12 discussed herein. The cycle computer 36 provides a user interface for the user to adjust various settings and/or operational functions of the first electrical component operating device 37 and the second electrical component operating device 38. The cycle computer 36 can also be used to select various operational modes such as an automatic shifting mode, a manual shifting mode, a semi-automatic shifting mode, etc.

For example, each of the manually operated input members SW1 and SW2 includes a pair of magnets, and each of the detection devices 37A, 37B, 38A and 38B is a Hall Effect sensor that detects the magnetic field of the corresponding magnets. A contact switch or optical sensor etc. can be used as the detection devices 37A, 37B, 38A and 38B. If a contact switch or an optical sensor is used as the detection devices 37A, 37B, 38A and 38B, then magnets are not needed. In any case, when one of the manually operated input members SW1 and SW2 is operated to activate one of the detection devices 37A, 37B, 38A and 38B, a corresponding one of the input signals outputted over the power cables that interconnect all of the bicycle electrical components 18, 20, 22, 34 and 35.

Preferably, the first and second manually operated input members SW1 and SW2 are configurable to be set so that the first and second manually operated input members SW1 and SW2 can be used to control one or two of the bicycle electrical components 18, 20, 22, 34 and 35 based on the user's settings. For example, using the cycle computer 36, the user can set the input member SW1 to change the height of the adjustable seatpost 22 up or down, and set the input member SW2 to change the shift stage of the front and rear derailleurs 34 and 35 in accordance with a preset synchro-shift pattern. Alternatively, the user can set the input member SW1 to change the shift stage of the front derailleur 34, and set the input member SW2 to change the shift stage of the derailleur 35 for manual shifting and the cycle computer 36 can be used to output a seatpost adjustment signal. Of course, a separate manually operated input member can be provided for each of the bicycle electrical components 18, 20, 22, 34 and 35 if needed and/or desired.

Figure 3:
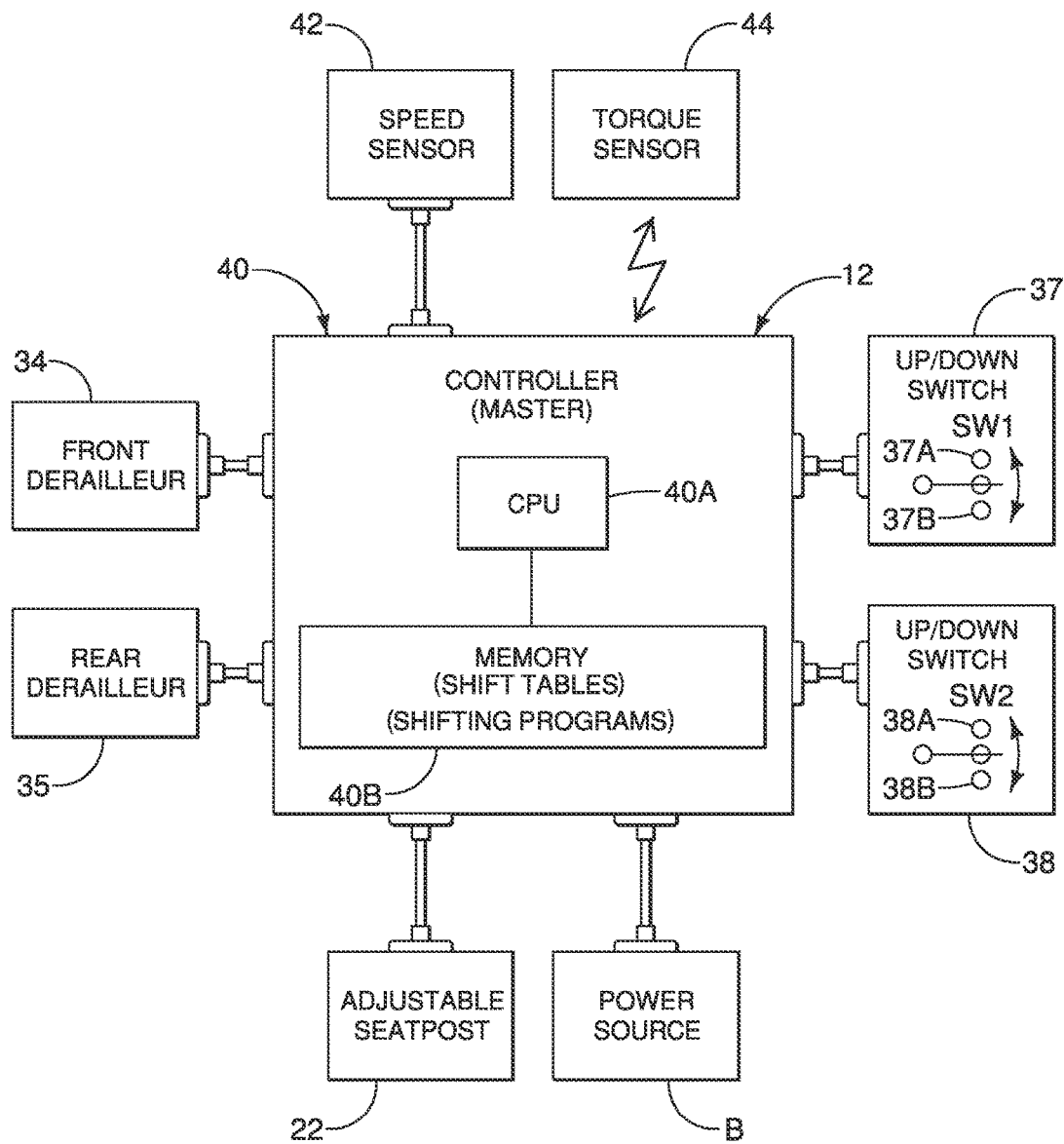
FIG. 3 is an overall schematic electrical diagram for the bicycle transmission control apparatus illustrated in FIG. 1.

Referring now to FIG. 3, a simplified schematic of the bicycle transmission control apparatus 12 is illustrated. Since the bicycle transmission control apparatus 12 uses power line communications (PLC) to communicate, the bicycle transmission control apparatus 12 comprises a controller 40 that is programmed to control the transmission 10 as discussed below. The bicycle transmission control apparatus 12 further comprises the adjustable seatpost 22, the derailleurs 34 and 35, and the operating devices 37 and 38. Since the front suspension fork 18 and the rear shock 20 are not a main focus of the bicycle transmission control apparatus 12, as discussed herein, the front suspension fork 18 and the rear shock 20 will not be discussed herein. Of course, it will be apparent from this disclosure that the front suspension fork 18 and the rear shock 20 can be included in the bicycle transmission control apparatus 12 and that the front suspension fork 18 and the rear shock 20 can be automatically adjusted by the bicycle transmission control apparatus 12, if needed and/or desired.

As seen in FIG. 3, the bicycle electrical components 22, 34 and 35 and the operating devices 37 and 38 are set up for communications utilizing power line communications (PLC) such as used in the Di2 electrical components sold by Shimano Inc. In FIG. 3, the bicycle 1 includes a power source B (e.g., a battery) for supplying electrical power to each of the bicycle electrical components 18, 20, 22, 34 and 35. The power source B can be any suitable electrical power source such as a rechargeable electrical battery, a disposable electrical battery, a fuel cell battery, etc.

As seen in FIGS. 2 and 3, the first electrical component operating device 37 includes a first manually operated input member SW1, while the second electrical component operating device 38 includes a second manually operated input member SW2. The first electrical component operating device 37 includes a first detection device 37A and a second detection device 37B, while the second electrical component operating device 38 includes a third detection device 38A and a second detection device 38B. These detection devices 37A, 37B, 38A or 38B constitute input indication sensors. The first detection device 37A detects movement of the first manually operated input member SW1 in first direction such that a first input signal is outputted. The second detection device 37B detects movement of the first manually operated input member SW1 in a second direction such that a second input signal is outputted. The third detection device 38A detects movement of the second manually operated input member SW2 in a first direction such that a third input signal is outputted. The fourth detection device 38B detects movement of the second manually operated input member SW2 in a second direction such that a fourth input control signal is outputted. The detection devices 37A, 37B, 38A and 38B can be contactless detection devices or contact detection devices, as needed and or desired. The first manually operated input member SW1 and the second manually operated input member SW2 could be divided two input members respectively. In this case, each input members relative to the detection devices 37A, 37B, 38A and can be operated independently.

In the illustrated embodiment, as illustrated in FIG. 3, the controller 40 is a dedicated master controller that communicates with each slave controller of the bicycle electrical components 22, 34 and 35 via the electrical power cables. Here, the controller 40 is provided on a wiring junction 14 that is remote from the bicycle electrical components 22, 34 and 35. However, the controller 40 can be provided on one of the bicycle electrical components 22, 34 and 35 instead of or in conjunction with the controllers that are provided on the bicycle electrical components 22, 34 and 35.

Preferably, the user can set the controller 40 using the cycle computer 36 or an external device (e.g. personal computer) so that the bicycle transmission 10 can be operated manually using one or both of the input members SW1 and SW2, or automatically using one or more automatic shifting modes. For the sake of brevity, manual shifting will not be discussed herein, since manual shifting is well known. Also, for the sake of brevity, only the rear derailleur 35 will be automatically operated in the automatic shifting modes as discussed herein. Of course, it will be apparent from this disclosure that both the front and rear derailleurs 34 and 35 can be operated in a synchro-shifting mode to obtain the desired shift stage.

Figure 6:
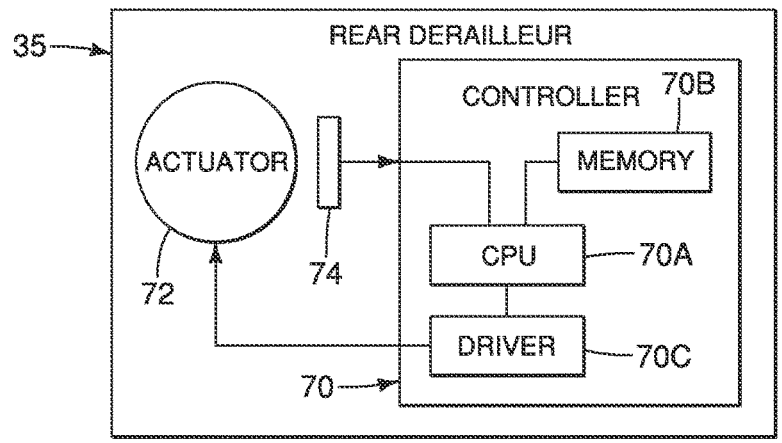
FIG. 6 is a schematic electrical diagram for the rear derailleur illustrated in FIG. 1.

As seen FIG. 6, the bicycle transmission 10 has eleven gear ratios with the chain 32 disposed on a front chainring having thirty-two teeth (32T) and the rear derailleur 35 selectively engaging with the rear sprockets. Here, the eleven rear sprockets have the following tooth count: 11T-13T-15T-17T-19T-21T-24T-27T-31T-35T-40T. The gear ratio is determined by dividing the tooth count of the front chainring by the tooth count of the rear sprocket (e.g., 32÷11=2.9).

Figure 9:
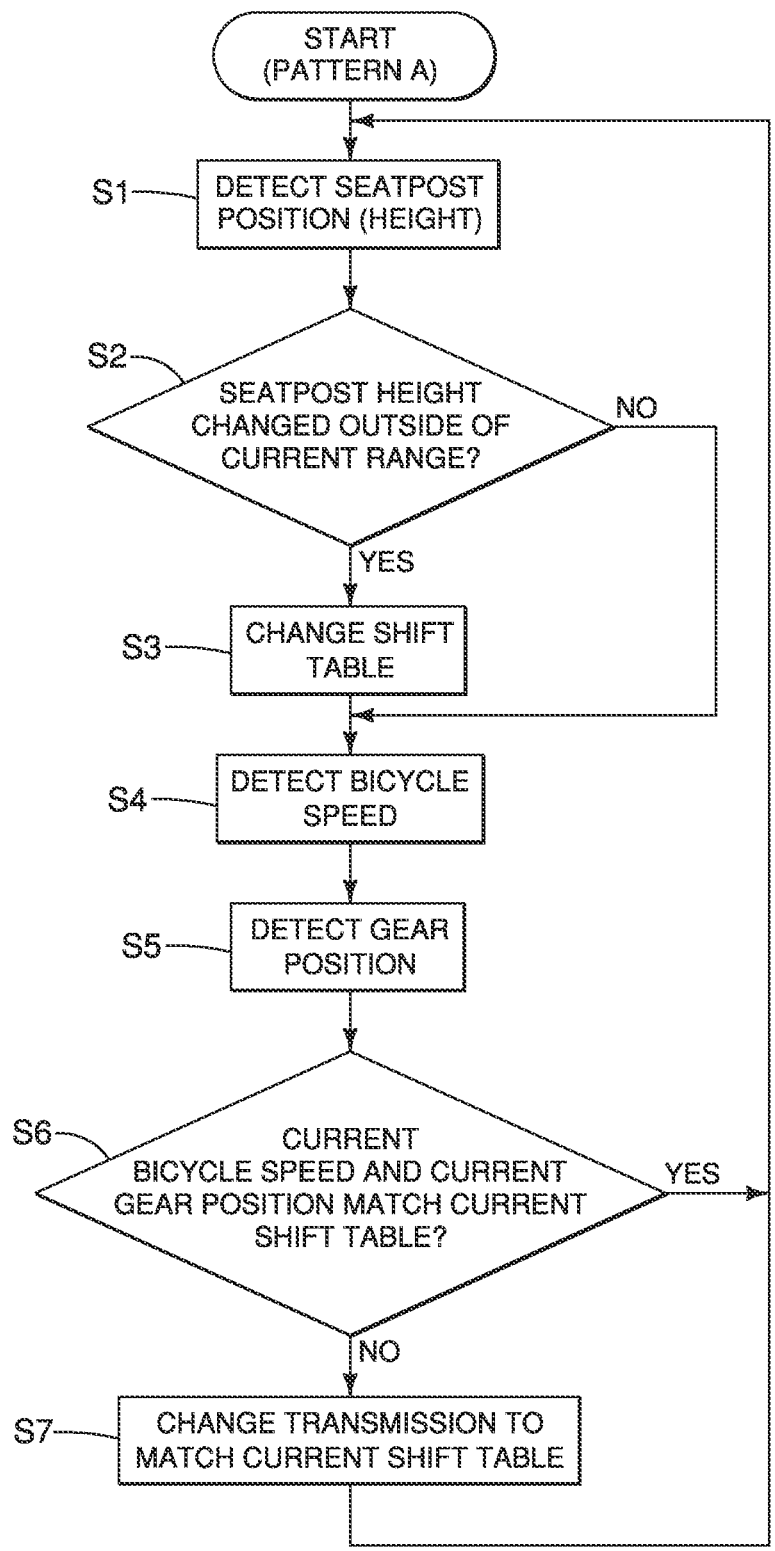
FIG. 9 is a first flowchart illustrating a first shift control process fir shifting the bicycle transmission of the bicycle illustrated in FIG. 1 based on the seat height information of the bicycle seat relative to the bicycle frame and the forward traveling speed of the bicycle using the first shift control pattern.
Figure 10:
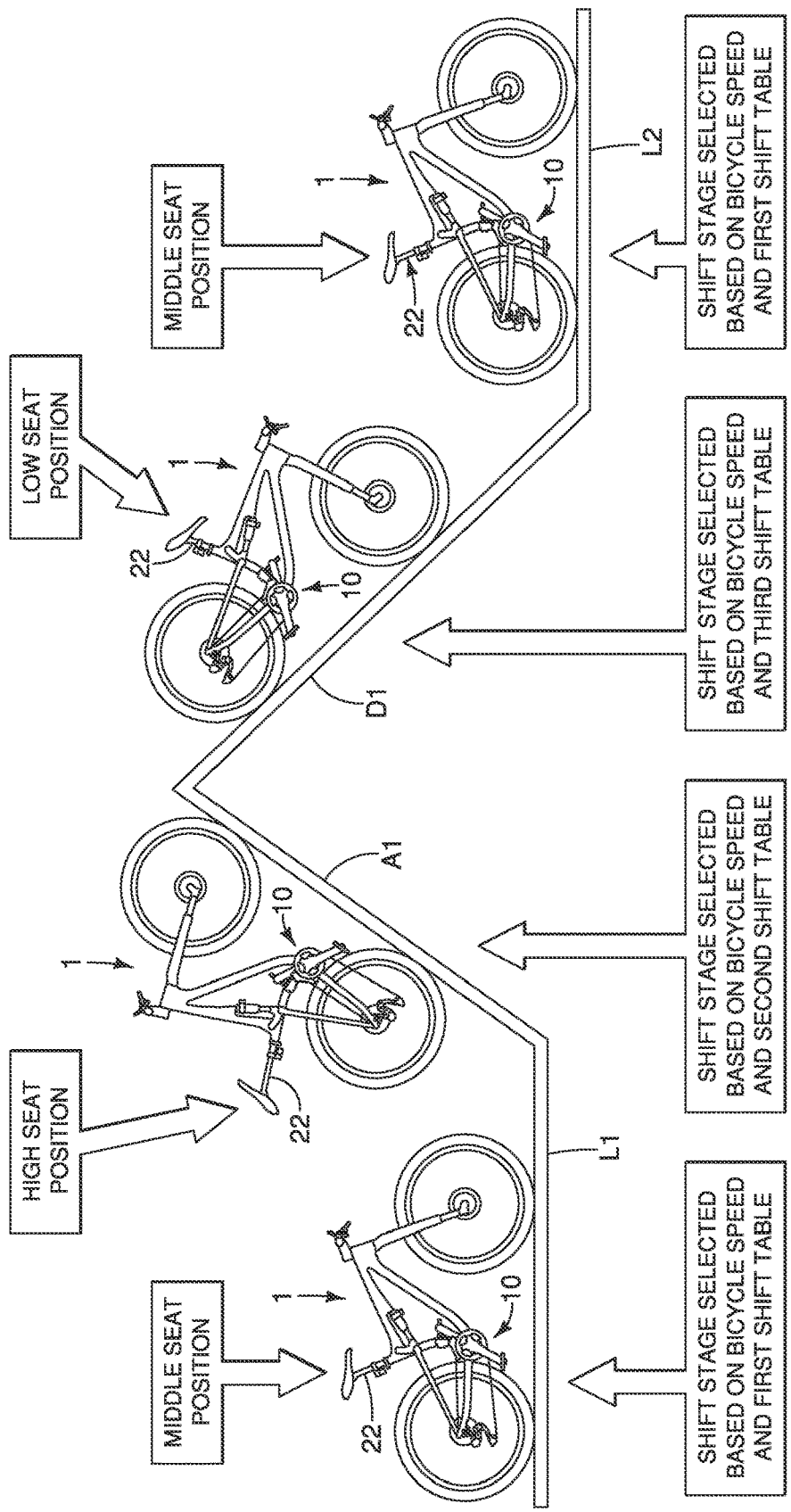
FIG. 10 is a simplified graphical illustration of the bicycle illustrated in FIG. 1 illustrating the bicycle seat height being adjusted as the bicycle travels along a terrain having a first level section, an ascending (uphill) section, a descending (downhill) section and a second level section in a traveling direction using the first shift control pattern and first shift control process.
Figure 12:
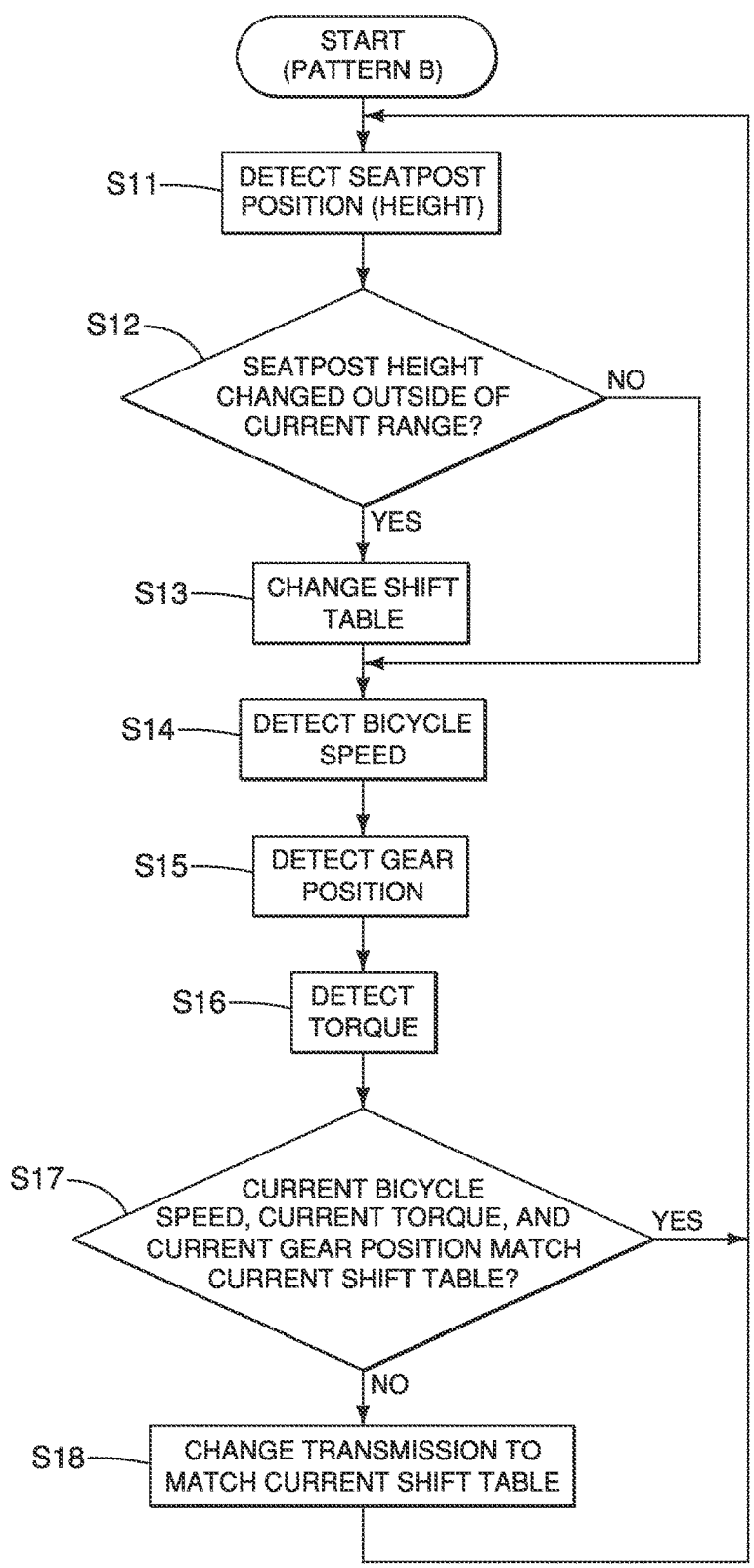
FIG. 12 is a second flowchart illustrating a second shift control process for shifting the bicycle transmission of the bicycle illustrated in FIG. 1 based on the seat height information of the bicycle seat relative to the bicycle frame, the forward traveling speed of the bicycle and the pedaling torque of the bicycle using the second shift control pattern.
Figure 13:
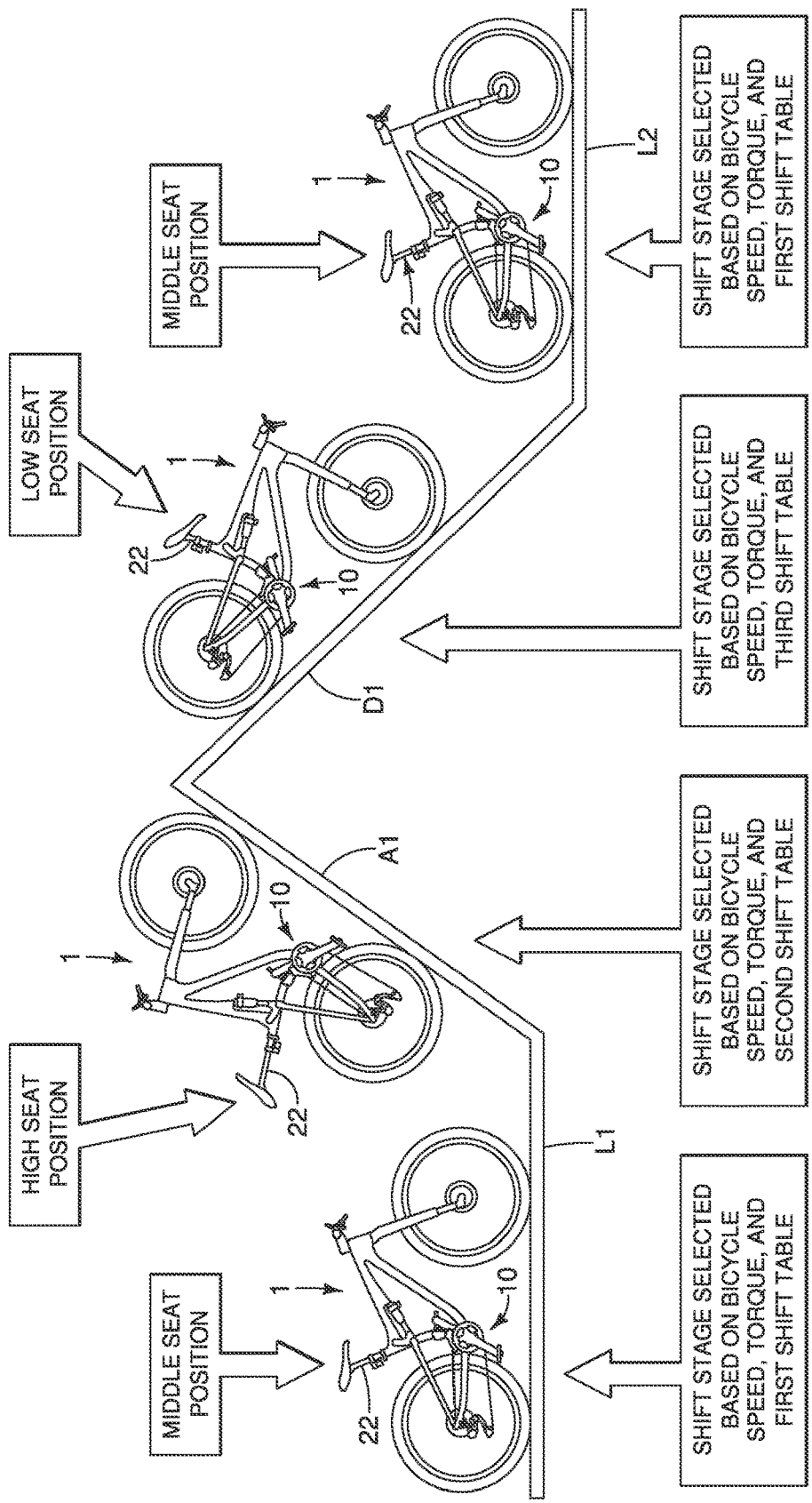
FIG. 13 is a simplified graphical illustration of the bicycle illustrated in FIG. 1 illustrating the bicycle seat height being adjusted as the bicycle travels along a terrain having a first level section, an ascending (uphill) section, a descending (downhill) section and a second level section in a traveling direction using the second shift control pattern and second shift control process.
Figures 14, 15:
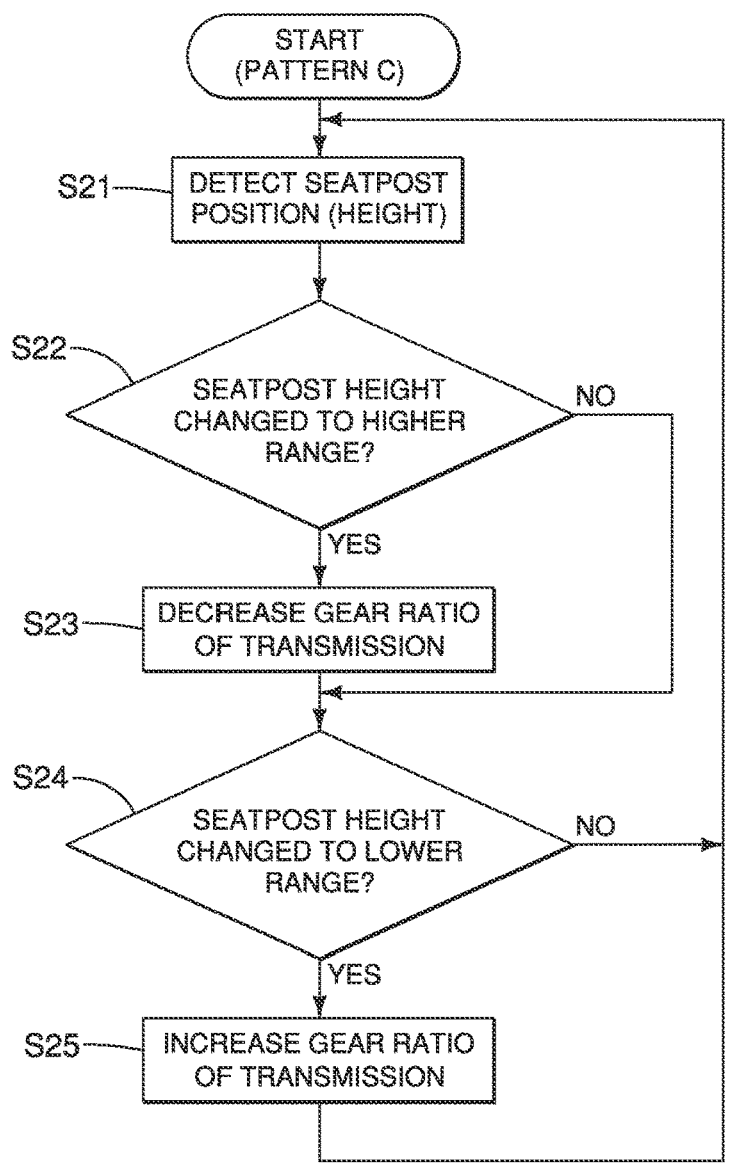
FIG. 14 is a third shift pattern used for semi-automatic shifting of the bicycle transmission of the bicycle illustrated in FIG. 1 for a seat priority mode control in which the gear ratio of the transmission is fixed based on the seat height information of the bicycle seat relative to the bicycle frame.
FIG. 15 is a third flowchart illustrating a third shift control process for shifting the bicycle transmission of the bicycle illustrated in FIG. 1 based on the seat height information of the bicycle seat relative to the bicycle frame using the seat priority mode control.
Figure 16:
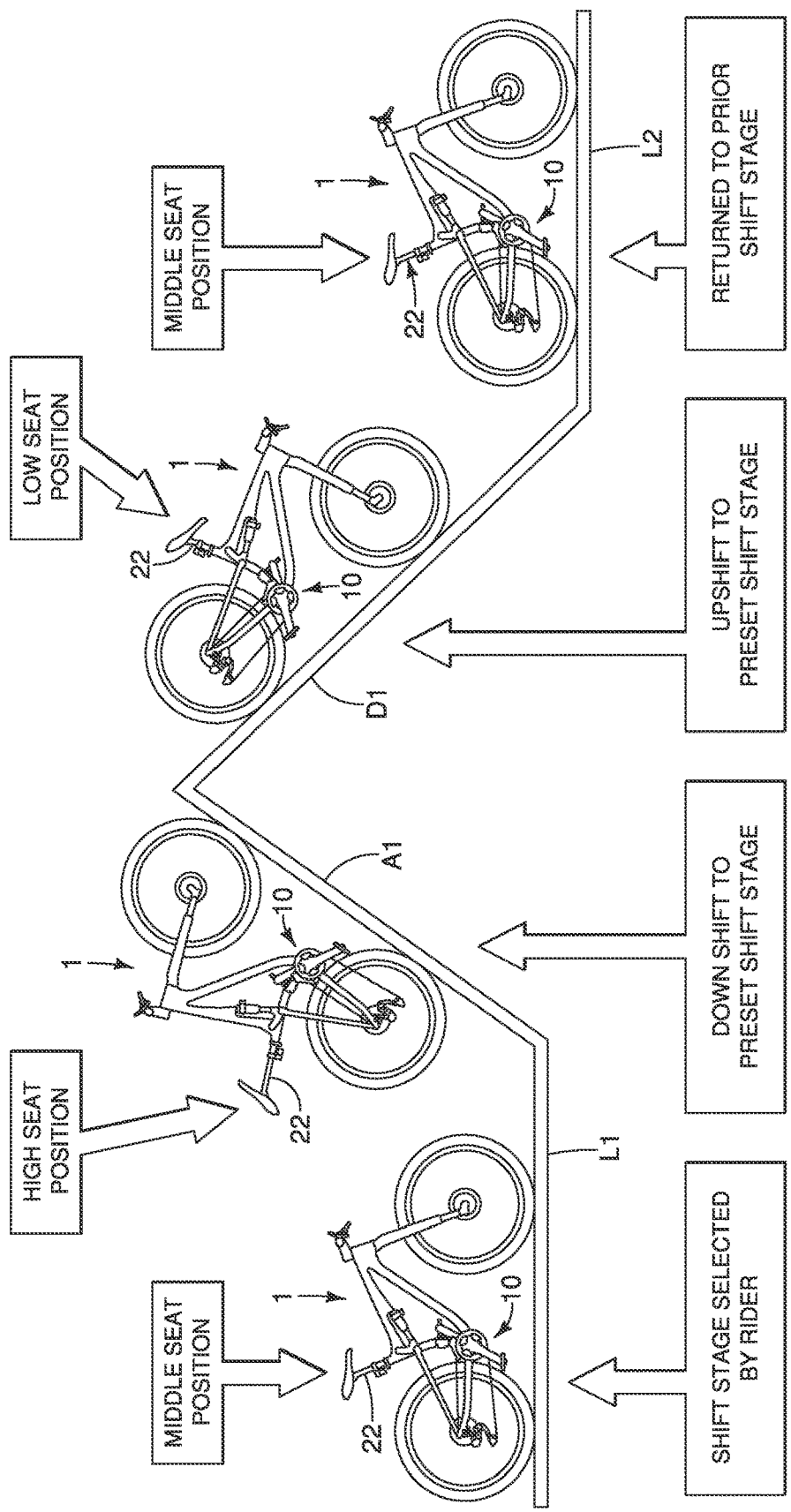
FIG. 16 is a simplified graphical illustration of the bicycle illustrated in FIG. 1 illustrating the bicycle seat height being adjusted as the bicycle travels along a terrain having a first level section, an ascending (uphill) section, a descending (downhill) section and a second level section in a traveling direction using the seat priority mode control and third shift control process.

As explained later in more detail, the bicycle transmission 10 can be controlled by the controller 40 of the bicycle transmission control apparatus 12 in response to the height (position) of the bicycle seat 30. Also the rider can choose which of the automatic shifting modes is to be used. In a first automatic shifting mode, as seen in FIGS. 8 to 10, the bicycle transmission 10 is shifted based on seat height information of the bicycle seat 30 and the bicycle speed. In a second automatic shifting mode, as seen in FIGS. 11 to 13, the bicycle transmission 10 is shifted based on seat height information of the bicycle seat 30, the bicycle speed and a pedaling torque applied by the rider. The rider can also choose a semi-automatic shifting mode, as seen in FIGS. 14 to 16 in which the bicycle transmission 10 is adjusted to a preset shift stage that provides a prescribed gear a ratio for each prescribed range of seat height (e.g., a low seat height of 0 millimeters to 70 millimeters, a middle seat height of 70 millimeters to 120 millimeters, and a high seat height of 120 millimeters to 150 millimeters). Of course, as mentioned above, the rider can also choose a manual shifting that can includes a synchro-shifting mode and a non-synchro-shifting mode.

Referring to FIGS. 1 and 3, the bicycle transmission control apparatus 12 further comprises a speed sensor 42 and a torque sensor 44. The speed sensor 42 is mounted on the swing arm 16 and arranged to detect a magnet M that is mounted on a spoke of the rear wheel 28. Thus, the speed sensor 42 senses each rotation of the rear wheel 28 as the magnet M passes the speed sensor 42. The speed sensor 42 can be a Hall Effect sensor or a reed switch that detects the magnetic field of the magnet M. The speed sensor 42 is connected to the controller 40 via electric cable. The torque sensor 44 is provided on one or each crank arm of the front pedal crankset 31 to detect a pedaling force applied to the front pedal crankset 31. The torque sensor 44 can be formed of one or more strain gauges. Also the torque sensor 44 is not limited to being mounted on the crank arm of the front pedal crankset 31. The torque sensor 44 could be mounted on pedals or a crank axle of the front pedal crankset 31. The torque sensor 44 is connected to the controller 40 via wireless communication. The controller 40 has a wireless communication device to receive a signal from the torque sensor 44.

Turning back to the controller 40, as seen in FIG. 3, the controller 40 is preferably a microcomputer that includes a central processing unit 40A with one or more processors. The controller 40 also preferably includes other conventional components such as an input interface circuit, an output interface circuit. The controller 40 of the bicycle transmission control apparatus 12 further comprises a memory 40B. The memory 40B can be any memory device (i.e., a non-transitory computer readable medium such as a ROM (Read Only Memory) device and a RAM (Random Access Memory) device, hard disk, etc.). The memory 40B is configured to store programming, data, calculations and/or results. In the illustrated embodiment, the memory 40B has a plurality of shift tables (see the shift control patterns of FIGS. 8, 11 and 14) prestored therein as the parameter for shifting the transmission 10. The controller 40 is configured to switch the shift table based on either seat height information or an indication input that the height of the seat 30 has changed. Also in the illustrated embodiment, the memory 40B has a plurality of prestored shifting programs (see flowcharts of FIGS. 9, 12 and 15) for controlling the transmission based on seat height information of the bicycle seat 30 relative to the bicycle frame 14. In particular, the memory 40B includes a first automatic shifting program, as shown in FIG. 9, for changing the gear ratio of the transmission based on the shift tables. The memory 40B includes a second automatic shifting program, as shown in FIG. 11, for changing the gear ratio of the transmission based on the shift tables. The memory 40B includes a third semi-automatic shifting program, as shown in FIG. 15, for changing the gear ratio of the transmission based on the shift tables. The controller 40 is configured to operate in one mode selected between a shift priority mode (the third semi-automatic shifting program) in which the gear ratio of the transmission is changed based on a shift command, and a seat priority mode (the first and second automatic shifting program) in which the gear ratio of the transmission is fixed based on the seat height information of the bicycle seat 30 relative to the bicycle frame 14 and the shift command is ignored.

Using one of the shift control patterns of FIGS. 8, 11 and 14, the controller 40 is configured to switch the shift table based on the seat height information of the bicycle seat 30 relative to the bicycle frame 14. In the case of the first and second shift control patterns used for automatic shifting of the transmission 10, as shown in FIGS. 9 and 11, the memory 40B includes a first shift table used when a height of the bicycle seat 30 relative to the bicycle frame 14 is in a first height range, a second shift table used when the height of the bicycle seat 30 relative to the bicycle frame 14 is in a second height range that is higher than the first height range, and a third shift table used when the height of the bicycle seat 30 relative to the bicycle frame 14 is in a third range that is higher than the second height range. In the case of the third shift control pattern used for semi-automatic shifting of the transmission 10, as shown in FIG. 15, the memory 40B includes a preset shift stage for the rear derailleur 35 to a obtain a prescribed gear ratio for each of the three seat height ranges. In each of the shift control patterns, there are three seat height ranges (e.g., a low seat height range of 0 millimeters to 70 millimeters, a middle seat height range of 70 millimeters to 120 millimeters, and a high seat height range of 120 millimeters to 150 millimeters). Of course, it will be apparent from this disclosure that the shift control patterns can have two seat height ranges or more than three seat height ranges as needed and/or desired.

Figure 4:
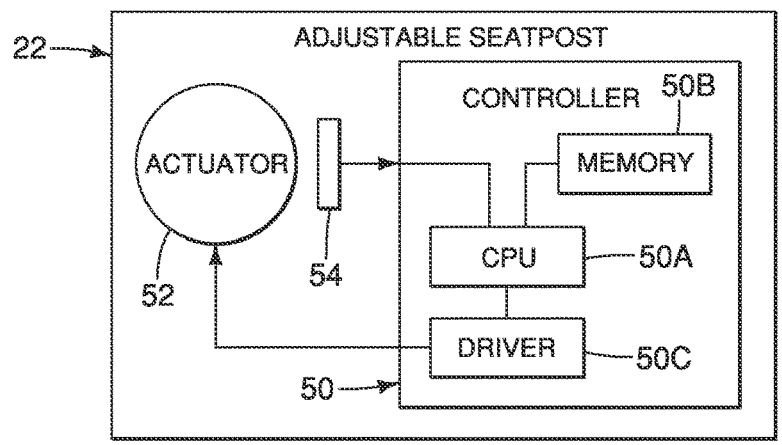
FIG. 4 is a schematic electrical diagram for the adjustable seatpost illustrated in FIG. 1.

As seen in FIG. 4, a simplified schematic of the adjustable seatpost 22 is illustrated. The adjustable seatpost 22 can be anyone of a hydraulically adjustable seatpost, a pneumatically adjustable seatpost and an electrically adjustable seatpost. In the illustrated embodiment, for example, the adjustable seatpost 22 includes a controller 50, an actuator 52 and a seatpost position sensor 54. However, the adjustable seatpost 22 may be a manually operating seatpost, e.g. hydroponic or air pressure, which is operated via a mechanical cable by a manual operation device. In this case, the manual operation device for the adjustable seatpost does not have a detection device, and the adjustable seatpost does not have the actuator and the driver.

The controller 50 is preferably a microcomputer that includes a central processing unit 50A with one or more processors, memory 50B, and a driver 50C for operating the actuator 52. The controller 50 also preferably includes other conventional components such as an input interface circuit, an output interface circuit. The memory 50B can be any memory device (i.e., a non-transitory computer readable medium such as a ROM (Read Only Memory) device and a RAM (Random Access Memory) device, hard disk, etc.). The memory 50B stores various parameters such as detection results of the seatpost position sensor 54. The bicycle transmission control apparatus 12 further comprises the bicycle seat position sensor 54 that is configured to transmit a bicycle seat position signal corresponding to a height of the bicycle seat 30 relative to the bicycle frame 14. Depending on the type of adjustable seatpost, the actuator 52 can be either motor that drives a telescoping seatpost part, or a solenoid that operates a valve for regulating a gas or a fluid. The bicycle seat position sensor 54 can be any suitable detection device such as a magnetic field sensor, an optical sensor, a potentiometer or a rotary encoder, depending on the type of adjustable seatpost.

Figure 5:
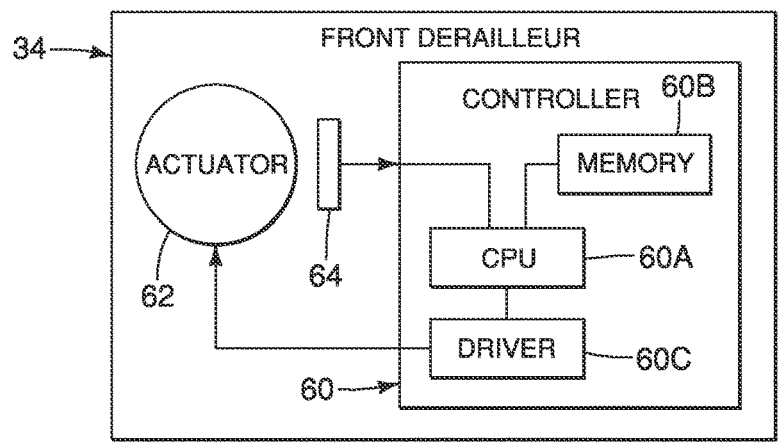
FIG. 5 is a schematic electrical diagram for the front derailleur illustrated in FIG. 1.

As seen in FIG. 5, a simplified schematic of the front derailleur 34 is illustrated. The front derailleur 34 is an electric transmission device. Basically, the front derailleur 34 includes a controller 60, an actuator 62 and a gear position sensor 64. The controller 60 is preferably a microcomputer that includes a central processing unit 60A with one or more processors, memory 60B, and a driver 60C for operating the actuator 62. The controller 60 also preferably includes other conventional components such as an input interface circuit, an output interface circuit. The memory 60B can be any memory device (i.e., a non-transitory computer readable medium such as a ROM (Read Only Memory) device and a RAM (Random Access Memory) device, hard disk, etc.). The memory 60B stores various parameters such as detection results of the gear position sensor 64. Here, the actuator 62 is a reversible motor. The gear position sensor 64 can be any suitable detection device such as an optical sensor, a potentiometer or a rotary encoder.

As seen in FIG. 6, a simplified schematic of the rear derailleur 35 is illustrated. The rear derailleur 35 is an electric transmission device. Basically, the rear derailleur 35 includes a controller 70, an actuator 72 and a gear position sensor 74. The controller 70 is preferably a microcomputer that includes a central processing unit 70A with one or more processors, memory 70B, and a driver 70C for operating the actuator 72. The controller 70 also preferably includes other conventional components such as an input interface circuit, an output interface circuit. The memory 70B can be any memory device (i.e., a non-transitory computer readable medium such as a ROM (Read Only Memory) device and a RAM (Random Access Memory) device, hard disk, etc.). The memory 70B stores various parameters such as detection results of the gear position sensor 74. Here, the actuator 72 is a reversible motor. The gear position sensor 74 can be any suitable detection device such as an optical sensor, a potentiometer or a rotary encoder. The controller 70 controls a gear position of the rear derailleur 35 based on the signal from the controller 50 on the adjustable seatpost 22.

The bicycle transmission control apparatus 12 further comprises an adjustable seatpost operating device (i.e., one of the first and second manually operated input members SW1 and SW2 in the illustrated embodiment) and a detection device (i.e., one of the detection devices 37A, 37B, 38A and 38B in the illustrated embodiment). The adjustable seatpost operating device (i.e., one of the first and second manually operated input members SW1 and SW2) is configured to produce the indication input (i.e., magnetic field) to change the height of the bicycle seat 30 relative to the bicycle frame 14. The detection device (i.e., one of the detection devices 37A, 37B, 38A and 38B) is configured to detect the indication input by the adjustable seatpost operating device (i.e., one of the first and second manually operated input members SW1 and SW2).

Basically, the controller 40 is configured to control the transmission 10 based on seat height information of the bicycle seat 30 relative to the bicycle frame 14. This control of the transmission 10 based on seat height information can be accomplished in several ways. In the illustrated embodiment, the seat height information includes at least one of a height of the bicycle seat 30 and a change of the height of the bicycle seat 30. In the illustrated embodiment, it is acceptable for the controller 40 to control the transmission 10 based on only one of the information from the seat post position sensor 54 or one of the detection devices 37A, 37B, 38A and 38B.

Also, preferably, the adjustable seatpost 22 can be set to be either incrementally or continuously moved by the actuator 52 in response to one of the input members SW1 and SW2 being continuously operated. For example, if the input member SW1 is set to operate the adjustable seatpost 22 in an incrementally manner, then the actuator 52 will be moved a prescribed amount for each operation of the input member SW1. In this case of the adjustable seatpost 22 being incrementally operated based on number of individual operations of the input member, the controller 40 controls the transmission 10 based on the information from the corresponding one of the detection devices 37A, 37B, 38A and 38B. On the other hand, if the input member SW1 is set to operate the adjustable seatpost 22 in a continuously manner, then the actuator 52 will be moved as long as the input member SW1 is continuously operated (i.e., depressed). In this case of the adjustable seatpost 22 being continuously operated based on the length of operation of the input member, the controller 40 controls the transmission 10 based on only the seat post position sensor 54.

One way of accomplishing this control of the transmission 10 is to use a change in the height of the adjustable seatpost 22. In this way, the controller 40 is configured to control a gear ratio of the transmission 10 based on seat height information of the bicycle seat 30 relative to the bicycle frame 14, or change a parameter for shifting the transmission 10 based on the seat height information of the bicycle seat 30 relative to the bicycle frame 14. The controller 40 is further configured to output a transmission control signal based on the bicycle seat position signal to the rear derailleur 35 for changing the shift stage of the transmission 10. Of course, the controller 40 could output a transmission control signal to one or both of the front and rear derailleurs 34 and 35 for changing the shift stage of the transmission 10, if needed and/or desired.

Another way of accomplishing this control of the transmission 10 is to use an indication that the height of the adjustable seatpost 22 will be changed. In this way, the controller 40 is configured to control a gear ratio of the transmission 10 based on an indication input for changing a height of the bicycle seat 30 relative to the bicycle frame 14, or change a parameter for shifting the transmission based on the indication input for changing the height of the bicycle seat 30 relative to the bicycle frame 14. The controller 40 is further configured to output a transmission control signal based on the indication input to the rear derailleur 35 for changing the shift stage of the transmission 10. Of course, the controller 40 could output a transmission control signal to one or both of the front and rear derailleurs 34 and 35 for changing the shift stage of the transmission 10, if needed and/or desired.

Thus, a user can program the controller 40 to control either a gear ratio or change a parameter for shifting of the transmission 10 based on seat height information of the bicycle seat 30 relative to a bicycle frame 14. Alternatively, a user can program the controller 40 to control either a gear ratio or change a parameter for shifting of the transmission 10 based on an indication input for changing the height of the bicycle seat 30 relative to the bicycle frame 14.

Referring now to FIGS. 8 to 10, the first shift control process carried out by the bicycle transmission control apparatus 12 will be discussed. Upon starting up the bicycle transmission control apparatus 12, the memory 40B, 50B, 60B and 70B are cleared of prior detection data. If the rider selects the first shift control program to control shifting of the transmission 10, then the controller 40 will output a shift control signal upon determining that the seatpost position or seatpost height has changed by receiving either a detection signal from the seatpost position sensor 54 or a detection signal from one of the detection devices 37A, 37B, 38A or 38B, depending on which the input members SW1 and SW2 is used for adjusting the adjustable seatpost 22. In the first shift control program, the controller 40 determines the gear ratio using the three shift tables (i.e., high, middle and low shift tables) of FIG. 8 in accordance with the detected seat height from the seatpost position sensor 54 and the detected bicycle speed from the speed sensor 42. Thus, the automatic shifting program of the flowchart shown in FIG. 9 is programmed to change the gear ratio of the transmission 10 based on a detected bicycle speed and a selected one of the shift tables.

As seen in FIG. 10, when the bicycle 1 is traveling over substantially level ground L1, the rider will normally have the seat 30 set to a height that is in a middle seat range of 70 millimeters to 120 millimeters. However, when the bicycle 1 starts ascending up a hill A1, the rider may change the height of the seat 30 to a high seat height range of 120 millimeters to 150 millimeters. Then, when the bicycle 1 starts descending down a hill D1, the rider may change the height of the seat 30 to a low seat height range of 0 millimeters to 70 millimeters. Finally, when the bicycle 1 subsequently starts traveling over substantially level ground L2, the rider may change the height of the seat 30 back to a middle seat height range. In any case, each time the rider changes the height of the seat 30, the controller 40 will check if the transmission 10 should be adjusted.

In step S1 of the flowchart shown in FIG. 9, the controller 40 detects the seatpost position or seatpost height by receiving either a detection signal from the seatpost position sensor 54 or a detection signal from one of the detection devices 37A, 37B, 38A or 38B. Then, the controller 40 stores in the memory 40B this detection result that is indicative of the seatpost position or seatpost height, and then proceeds to step S2.

In step S2, the controller 40 determines whether the seatpost position or seatpost height has changed outside of the current range. Since previous detection results stored in the memory 40B is cleared upon shutting off the bicycle transmission control apparatus 12, in step S2 of the control process, the controller 40 determines is that the seatpost position or seatpost height has not changed outside of the current range for the first run through the control process. The controller 40 proceeds to step S4 if the seatpost position or seatpost height has not changed outside of the current range. On the other hand, the controller 40 proceeds to step S3 if the seatpost position or seatpost height has changed outside of the current range.

In step S3, the controller 40 changes (updates) the shift table that is to be used to determine the shift stage for the transmission 10. Then the controller 40 proceeds to step S4.

In step S4, the controller 40 detects the bicycle speed by receiving a detection signal from the speed sensor 42. Then, the controller 40 stores in the memory 40B this detection result that is indicative of the bicycle speed, and then proceeds to step S5.

In step S5, the controller 40 detects the bicycle gear position by receiving a detection signal from the gear position sensor 74. Then, the controller 40 stores in the memory 40B this detection result that is indicative of the gear position, and then proceeds to step S6.

In step S6, the controller 40 determines whether the current bicycle speed and the current gear position matches the current shift table. Since previous detection results stored in the memory 40B is cleared upon shutting off the bicycle transmission control apparatus 12, the controller 40 determines that the current bicycle speed and the current gear position matches the current shift table for the first run through the control process. The controller 40 proceeds to back to step S1 if the current bicycle speed and the current gear position matches the current shift table. On the other hand, if the current bicycle speed and the current gear position do not match the selection of the current shift table (updated in step S3), then the controller 40 proceeds to step S7.

In step S7, the controller 40 changes the transmission 10 to match the current shift table. Then the controller 40 proceeds to back to step S1.

Referring now to FIGS. 11 to 13, the second shift control process carried out by the bicycle transmission control apparatus 12 will be discussed. Upon starting up the bicycle transmission control apparatus 12, the memory 40B, 50B, 60B and 70B are cleared of prior detection data. If the rider selects the second shift control program to control shifting of the transmission 10, then the controller 40 will output a shift control signal upon determining that the seatpost position or seatpost height has changed by receiving either a detection signal from the seatpost position sensor 54 or a detection signal from one of the detection devices 37A, 37B, 38A or 38B, depending on which the input members SW1 and SW2 is used for adjusting the adjustable seatpost 22. In the second shift control program, the controller 40 determines the gear ratio using the three shift tables (i.e., high, middle and low shift tables) of FIG. 11 in accordance with the detected seat height from the seatpost position sensor 54, the detected bicycle speed from the speed sensor 42 and the detected pedaling torque from the torque sensor 44. Thus, the automatic shifting program of the flowchart shown in FIG. 12 is programmed to change the gear ratio of the transmission 10 based on a detected bicycle speed, a pedaling torque and a selected one of the shift tables.

In step S11 of the flowchart shown in FIG. 12, the controller 40 detects the seatpost position or seatpost height by receiving either a detection signal from the seatpost position sensor 54 or a detection signal from one of the detection devices 37A, 37B, 38A or 38B. Then, the controller 40 stores in the memory 40B this detection result that is indicative of the seatpost position or seatpost height, and then proceeds to step S12.

In step S12, the controller 40 determines whether the seatpost position or seatpost height has changed outside of the current range. The controller 40 proceeds to step S14 if the seatpost position or seatpost height has not changed outside of the current range. On the other hand, the controller 40 proceeds to step S13 if the seatpost position or seatpost height has changed outside of the current range.

In step S13, the controller 40 changes (updates) the shift table that is to be used to determine the shift stage for the transmission 10. Then the controller 40 proceeds to step S14.

In step S14, the controller 40 detects the bicycle speed by receiving a detection signal from the speed sensor 42. Then, the controller 40 stores in the memory 40B this detection result that is indicative of the bicycle speed, and then proceeds to step S15.

In step S15, the controller 40 detects the bicycle gear position by receiving a detection signal from the gear position sensor 74. Then, the controller 40 stores in the memory 40B this detection result that is indicative of the gear position, and then proceeds to step S16.

In step S16, the controller 40 detects the pedaling torque by receiving a detection signal from the pedaling torque sensor 44. Then, the controller 40 stores in the memory 40B this detection result that is indicative of the bicycle speed, and then proceeds to step S16.

In step S17, the controller 40 determines whether the current bicycle speed and the current gear position matches the current shift table. The controller 40 then proceeds to back to step S11 if the current bicycle speed and the current gear position matches the current shift table. On the other hand, if the current bicycle speed, the current pedaling torque and the current gear position do not match the selection of the current shift table (updated in step S13), then the controller 40 proceeds to step S18.

In step S18, the controller 40 changes the transmission 10 to match the current shift table. Then the controller 40 proceeds to back to step S11.

Referring now to FIGS. 14 to 16, the third shift control process carried out by the bicycle transmission control apparatus 12 will be discussed. Upon starting up the bicycle transmission control apparatus 12, the memory 40B, 50B, 60B and 70B are cleared of prior detection data. If the rider selects the second shift control program to control shifting of the transmission 10, then the controller 40 will output a shift control signal upon determining that the seatpost position or seatpost height has changed by receiving either a detection signal from the seatpost position sensor 54 or a detection signal from one of the detection devices 37A, 37B, 38A or 38B, depending on which the input members SW1 and SW2 is used for adjusting the adjustable seatpost 22. In the third shift control program, the controller 40 determines the gear ratio using the three prescribed gear ratios (e.g., high, middle and low shift gear ratios of FIG. 14) in accordance with the detected seat height from the seatpost position sensor 54. Here, the rider selects a gear ratio and the semi-automatic shilling program changes the gear ratio up or down from the current rider selected gear ratio. Thus, the semi-automatic shifting program of the flowchart shown in FIG. 15 is programmed to change the gear ratio of the transmission 10 based on a change in the height of the seat 30.

In step S21 of the flowchart shown in FIG. 12, the controller 40 detects the seatpost position or seatpost height by receiving either a detection signal from the seatpost position sensor 54 or a detection signal from one of the detection devices 37A, 37B, 38A or 38B. Then, the controller 40 stores in the memory 409 this detection result that is indicative of the seatpost position or seatpost height, and then proceeds to step S22.

In step S22, the controller 40 determines whether the seatpost position or seatpost height has changed to a higher range. The controller 40 proceeds to step S24 if the seatpost position or seatpost height has not changed to a higher range. On the other hand, the controller 40 proceeds to step S23 if the seatpost position or seatpost height has changed to a higher range.

In step S23, the controller 40 decreases the gear ratio from the current gear ratio by at least one shift stage. Preferably, the current gear ratio is decreased by three shift stages, if possible. The user may set how many shift stages are decreased by the cycle computer 36 and/or an external device. If decreasing by three shift stages is not possible, then the controller 40 decreases the gear ratio by the maximum possible of shift stages available. Then the controller 40 proceeds to step S24.

In step S24, the controller 40 determines whether the seatpost position or seatpost height has changed to a lower range. The controller 40 proceeds to step S24 if the seatpost position or seatpost height has not changed to a lower range. On the other hand, the controller 40 proceeds to step S23 if the seatpost position or seatpost height has changed to a lower range.

In step S25, the controller 40 increases the gear ratio from the current gear ratio by at least one shift stage. Preferably, the current gear ratio is increased by three shift stages, if possible. The user may set how many shift stages are increased by the cycle computer 36 and/or an external device. If decreasing by three shift stages is not possible, then the controller 40 decreases the gear ratio by the maximum possible of shift stages available. In FIG. 16, when the seat position is changed from the high seat position to the low seat position, the range of the seat post height changed twice. So in this case, the current gear ratio is increased by six shift stages, if possible. As a result, as seen in FIG. 16, the controller 40 returns the transmission back to original shift stage before the shift stage was changed based on the seat position when the bicycle 1 travels from substantially level ground L1, up the incline A1 of the hill, then down the incline D1 and then back to substantially level ground L2 in case that the rider does not shift by himself. After adjusting the transmission 10, then the controller 40 proceeds back to step S21. The number of the changed speed stages may be same in the step S23 and in the step S25 or different between the step S23 and the step S25.

While in this third shift control process, when the height of the adjustable seatpost 22 is changed, the controller 40 commands the controller 70 of the rear derailleur 35 to also change the speed stage. However, while in this third shift control process, if the rider feels that the shift stage is not comfortable, then the rider can manually change the shift stage.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle transmission control apparatus. Accordingly, these directional terms, as utilized to describe the bicycle transmission control apparatus should be interpreted relative to a bicycle in an upright riding position on a horizontal surface and that is equipped with the bicycle transmission control apparatus. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed (e.g., manufacturing tolerances).

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle transmission control apparatus comprising:
a controller configured to change a gear ratio of a transmission based on at least one of a seat height of a bicycle seat relative to a bicycle frame and a change of the seat height relative to the bicycle frame, or configured to adjust a shift table for shifting the transmission based on at least one of the seat height relative to the bicycle frame and the change of the seat height relative to the bicycle frame.

2. The bicycle transmission control apparatus according to claim 1, further comprising
a bicycle seat position sensor configured to transmit a bicycle seat position signal corresponding to a height of the bicycle seat relative to the bicycle frame.

3. The bicycle transmission control apparatus according to claim 2, wherein
the controller is further configured to output a transmission control signal based on the bicycle seat position signal.

4. The bicycle transmission control apparatus according to claim 1, further comprising
a memory having a plurality of shift tables prestored therein for shifting the transmission, the controller being configured to switch the shift table based on the seat height information of the bicycle seat relative to the bicycle frame.

5. The bicycle transmission control apparatus according to claim 4, wherein
the memory includes a first shift table used when a height of the bicycle seat relative to the bicycle frame is in a first height range, a second shift table used when the height of the bicycle seat relative to the bicycle frame is in a second height range that is higher than the first height range, and a third shift table used when the height of the bicycle seat relative to the bicycle frame is in a third range that is higher than the second height range.

6. The bicycle transmission control apparatus according to claim 4, wherein
the memory includes an automatic shifting program for changing the gear ratio of the transmission based on the shift tables.

7. The bicycle transmission control apparatus according to claim 6, wherein
the automatic shifting program is programmed to change the gear ratio of the transmission based on a detected bicycle speed and a selected one of the shift tables.

8. The bicycle transmission control apparatus according to claim 6, wherein
the automatic shifting program is programmed to change the gear ratio of the transmission based on a detected bicycle speed, a pedaling torque and a selected one of the shift tables.

9. The bicycle transmission control apparatus according to claim 6, wherein
the controller is configured to operate in one mode selected between a shift priority mode in which the gear ratio of the transmission is changed based on a shift command, and a seat priority mode in which the gear ratio of the transmission is fixed based on the seat height information of the bicycle seat relative to the bicycle frame and the shift command is ignored.

10. A bicycle transmission control apparatus comprising:
a controller configured to change a gear ratio of a transmission based on an indication input for changing a height of a bicycle seat relative to a bicycle frame, or configured to adjust a shift table for shifting the transmission based on the indication input for changing the height of the bicycle seat relative to the bicycle frame.

11. The bicycle transmission control apparatus according to claim 10, further comprising:
an adjustable seatpost operating device configured to produce the indication input to change the height of the bicycle seat relative to the bicycle frame; and
a detection device configured to detect the indication input by the adjustable seatpost operating device.

12. The bicycle transmission control apparatus according to claim 10, wherein
the controller is further configured to output a transmission control signal based on the indication input.

13. The bicycle transmission control apparatus according to claim 12, further comprising
a memory having a plurality of shift tables prestored therein for shifting the transmission, the controller being configured to switch the shift table based on the indication input.

14. The bicycle transmission control apparatus according to claim 13, wherein
the memory includes an automatic shifting program for changing the gear ratio of the transmission based on the shift tables.

15. The bicycle transmission control apparatus according to claim 14, wherein
the automatic shifting program is programmed to change the gear ratio of the transmission based on a detected bicycle speed and a selected one of the shift tables.

16. The bicycle transmission control apparatus according to claim 14, wherein
the automatic shifting program is programmed to change the gear ratio of the transmission based on a detected bicycle speed, a pedaling torque and a selected one of the shift tables.

* * * * *